(12) United States Patent
Kuramoto (10) Patent No.: US 8,919,810 B2
(45) Date of Patent: Dec. 30, 2014

(54) AIR BAG

(75) Inventor: Takahiro Kuramoto, Osaka (JP)

(73) Assignee: Toyobo Co., Ltd., Osaka (JP)

( * ) Notice: Subject to any disclaimer, the term of this patent is extended or adjusted under 35 U.S.C. 154(b) by 0 days.

(21) Appl. No.: 14/001,698

(22) PCT Filed: Feb. 16, 2012

(86) PCT No.: PCT/JP2012/053616
§ 371 (c)(1),
(2), (4) Date: Aug. 27, 2013

(87) PCT Pub. No.: WO2012/120985
PCT Pub. Date: Sep. 13, 2012

(65) Prior Publication Data
US 2013/0328293 A1    Dec. 12, 2013

(30) Foreign Application Priority Data

Mar. 10, 2011    (JP) ................................ 2011-052924

(51) Int. Cl.
| | |
|---|---|
| *B60R 21/235* | (2006.01) |
| *D03D 13/00* | (2006.01) |
| *D03D 1/02* | (2006.01) |
| *B60R 21/233* | (2006.01) |

(52) U.S. Cl.
CPC ............ *B60R 21/235* (2013.01); *D03D 13/008* (2013.01); *D03D 1/02* (2013.01); *B60R 21/233* (2013.01); *B60R 2021/23576* (2013.01)
USPC ......................... 280/728.1; 428/36.1; 442/203

(58) Field of Classification Search
CPC .................. B60R 21/235; B60R 2021/23509; B60R 2021/23514; B60R 2021/23538; B60R 2021/23576; D03D 1/02; D03D 15/00
USPC ........................ 280/728.1; 428/36.1; 442/203
See application file for complete search history.

(56) References Cited

U.S. PATENT DOCUMENTS

| | | | |
|---|---|---|---|
| 5,215,795 A | * | 6/1993 | Matsumoto et al. ......... 428/36.1 |
| 5,540,965 A | | 7/1996 | Nishimura et al. |

(Continued)

FOREIGN PATENT DOCUMENTS

| | | | | |
|---|---|---|---|---|
| JP | 07164988 A | * | 6/1995 | .............. B60R 21/16 |
| JP | 07309186 A | * | 11/1995 | .............. B60R 21/16 |

(Continued)

OTHER PUBLICATIONS

Japanese Patent Office, International Search Report for International Patent Application PCT/JP2012/053616 (May 29, 2012).

*Primary Examiner* — Paul N Dickson
*Assistant Examiner* — Laura Freedman
(74) *Attorney, Agent, or Firm* — Fish & Richardson P.C.

(57) ABSTRACT

The disclosure describes an air bag having a mechanical characteristic durable against the gas of high output and high temperature generated from an inflator, while reducing amount of the gas leaked from a sewn part of the air bag. The air bag can be used for vehicles and includes a main body part consisting of a base fabric and a sewn part being formed by sewing, with a sewing thread, the main body part into a bag, wherein a difference between an elongation of the sewing thread upon applying a tension of 31.3/a (N/thread) to the sewing thread and an elongation of the base fabric upon applying a tension of 62.5/a to the base fabric (N/stitch), wherein "a" (stitch(es)/cm) is a sewing pitch in the sewn part, is within a range of 0 to 5.0% in both directions of warp and weft, and an air permeability of the sewn part at 40 kPa during an initial stage of development of the air bag is less than 50 mm/cm/sec.

7 Claims, 2 Drawing Sheets

(56) References Cited

U.S. PATENT DOCUMENTS

| | | | |
|---|---|---|---|
| 5,612,124 A * | 3/1997 | Krummheuer et al. | 442/181 |
| 5,637,385 A * | 6/1997 | Mizuki et al. | 442/361 |
| 5,657,798 A * | 8/1997 | Krummheuer et al. | 139/420 A |
| 5,989,660 A * | 11/1999 | Moriwaki et al. | 428/35.2 |
| 6,022,817 A * | 2/2000 | Lewis et al. | 442/189 |
| 6,748,980 B2 * | 6/2004 | Matsui et al. | 139/384 R |
| 7,498,280 B2 * | 3/2009 | DeBenedictis et al. | 442/181 |
| 7,560,061 B2 * | 7/2009 | Yu et al. | 264/289.6 |
| 8,261,779 B2 * | 9/2012 | Horiguchi et al. | 139/387 R |
| 8,278,227 B2 * | 10/2012 | Shibaoka et al. | 442/203 |
| 2003/0008582 A1 * | 1/2003 | Koketsu et al. | 442/195 |
| 2010/0048079 A1 * | 2/2010 | Fujiyama et al. | 442/189 |

FOREIGN PATENT DOCUMENTS

| | | | |
|---|---|---|---|
| JP | 10-219543 | 8/1998 | |
| JP | 2001-71850 | 3/2001 | |
| JP | 2001-301557 | 10/2001 | |
| JP | 2002-293209 | 10/2002 | |
| JP | 2003-55861 | 2/2003 | |
| JP | 2005-14841 | 1/2005 | |
| JP | 2006-16707 | 1/2006 | |
| JP | 2006248521 A * | 9/2006 | B60R 21/16 |
| WO | 95/10652 | 4/1995 | |

* cited by examiner

AIR BAG

TECHNICAL FIELD OF THE INVENTION

The present invention relates to an air bag for ensuring safety of the passengers upon collision and, more particularly, it relates to an air bag where the amount of gas leaked from sewn part is reduced while high output due to compacted inflator in recent years and also mechanical characteristic durable to high-temperature gas are still achieved.

BACKGROUND ART

In recent years, air bags have been widely used as the safety devices for protecting the passengers upon collision. As to a base fabric for an air bag, a base fabric prepared by coating surface of woven fabric with silicone rubber or the like has been used. However, an air bag using such a surface-coated woven fabric causes a considerable increase in cost as a result of a coating treatment and also becomes heavy and thick. Therefore, recently, investigations for an air bag using a non-coat woven fabric where no surface coating is done or the so-called non-coat air bag have been carried out and a part thereof has been already in practical use.

Further, in recent years, there has been a demand for making an air bag itself light in weight and compact in size. For such a purpose, an inflator is also demanded for making its size compact. However, compacting the inflator results in high output and high temperature of the generated gas and the pressure applied to the air bag itself by the gas upon development tends to become high. Unfortunately, when the pressure upon development becomes high, there is a problem that gas leakage from base fabric or particularly from sewn part of base fabric of an air bag becomes high whereby the properties as an air bag cannot be satisfied. For solving this problem, various air bags have been proposed already (for example, see Patent Documents 1-4).

In the art of Patent Document 1, fineness and density of base fabric, and coating amount of synthetic resin, etc. are adjusted as a result of paying attention to gas leakage from stitches in a sewn part whereby air permeability of the sewn part under the presumed pressure at the time of development and of receiving the passenger is adjusted. However, the Patent Document 1 merely discloses that air permeability of the sewn part is affected by air permeability of the main body part consisting of the base fabric. The Patent Document 1 does not disclose a method for adjusting the air permeability of the sewn part itself.

Patent Document 2 discloses an air bag where auxiliary fabric is integrally sewn to a sewn part as a result of paying the attention to gas leakage and burst due to stitch opening of the sewn part. According to such an air bag, air permeability in the sewn part is reduced and, even in the base fabric of low fineness, suppression of burst upon development is possible. However, practical implementation of said air bag is difficult because of the disadvantages such as troublesomeness of the work, an increase in the mass of air bag and also an increase in cost due to an integral sewing of the auxiliary fabric.

Patent Document 3 discloses a base fabric for an air bag where three indexes of cover factor, tensile strength and edge-comb resistance are stipulated to specific ranges. Although the base fabric for an air bag achieves improvement in edge-comb resistance and reduction in slippage using a thread of relatively high fineness (not less than 400 dtex) and making the cover factor as high as possible, there is no investigation at all therein for a base fabric where the elongation of base fabric and the elongation of sewn part upon development are within predetermined ranges particularly because of high fineness of the base fabric.

Patent Document 4 discloses an air bag where a base fabric of very low fineness (110 to 185 dtex) is sewn with a precise pitch using sewing thread of low fineness. This air bag is light in weight and compact in size by decreasing the slippages but, due to the use of base fabric of low fineness, the air bag is not resistant to the gas of high output and high temperature generated from a compacted inflator.

Patent Documents 5 and 6 each discloses a base fabric for non-coat air bag using a fiber having a single thread in a rectangular cross section and a flat cross section, respectively. In the base fabric as such, flatness and surface unevenness of cross section of the single thread and also amount of oil in the spinning are stipulated to increase the friction coefficient between the fibers whereupon slidability of the thread surface is controlled and improvement in slippage of the sewn part is achieved. However, in those Patent Documents, there is no investigation at all for the base fabric where slippage of sewn part due to the specifying of the relation between elongations of "base fabric" and "sewing thread" upon development of an air bag or, particularly, the elongation of base fabric and the elongation of sewn part upon development are within predetermined ranges due to the high fineness of the base fabric.

PRIOR ART DOCUMENTS

Patent Documents

Patent Document 1: Japanese Patent Application Laid-Open (JP-A) No. 2001-71850
Patent Document 2: Japanese Patent Application Laid-Open (JP-A) No. 2005-14841
Patent Document 3: Japanese Patent Application Laid-Open (JP-A) No. 2006-16707
Patent Document 4: Japanese Patent Application Laid-Open (JP-A) No. 2001-301557
Patent Document 5: Japanese Patent Application Laid-Open (JP-A) No. 2002-293209
Patent Document 6: Japanese Patent Application Laid-Open (JP-A) No. 2003-55861

DISCLOSURE OF THE INVENTION

Problem that the Invention is to Solve

The present invention has been achieved based on the problems in the prior art as such and an object of the present invention is to provide an air bag having a mechanical characteristic durable against the gas of high temperature leaked from sewn part of the air bag while the thermodynamic characteristic of the base fabric itself is enhanced by the high-output and high-temperature gas generated from an inflator which has been compacted in recent years.

Means for Solving the Problem

The present inventors have intensively investigated the above problems and, as a result, they paid their attention to the movement of "base fabric" and "sewing thread" upon development of an air bag. They found that slippage generated between the base fabric and the sewing thread (which slippage causes the gas leakage of the sewn part) can be suppressed and the development characteristic of an airbag can be greatly improved when the difference between the elongation A (%) of a sewing thread upon applying the tension of 31.3/a (unit: N/thread) to the sewing thread and the elongation B (%) of a base fabric upon applying the tension of 62.5/a (unit: N/stitch) to the base fabric is controlled to a specific range [wherein "a" (unit: stitch(es)/cm) is a sewing pitch in the sewn part] whereupon the present invention has been achieved. It has been also found that, particularly when the elongation B (%) is less than 2% in both directions of warp and weft, the outcome is more preferable for a low-cost inflator.

Thus, the air bag of the present invention is an air bag for vehicles comprising a main body part consisting of a base fabric and a sewn part being formed by sewing, with a sewing thread, the above main body part into a bag, characterized in that, the difference (A−B) between the elongation A (unit: %) of the sewing thread upon applying the tension of 31.3/a (unit: N/thread) to the sewing thread and the elongation B (unit: %) of the base fabric upon applying the tension of 62.5/a (unit: N/stitch) to the base fabric [wherein "a" (unit: stitch(es)/cm) is a sewing pitch in the sewn part] is within a range of 0 to 5.0% in both directions of warp and weft and the air permeability of the sewn part at 40 kPa during the initial stage of development of an air bag is less than 50 mm/cm/sec.

As a result of controlling the elongation difference (A−B) in the sewing thread and the base fabric under the specific tension as mentioned above to a range of 0 to 5.0% in both directions of warp and weft, the sewing thread can follow the movement of the base fabric during the inner pressure upon development of an air bag. Therefore, slippage of the stitch hardly happens. In addition, as a result of such a constitution, air permeability of the sewn part at 40 kPa corresponding to the initial stage of development of the air bag can be made less than 50 mm/cm/sec.

It is preferred that the base fabric of an air bag of the present invention has cover factor (CF) of from 2050 to 2400. It is also preferred that the base fabric is constituted from multifilament having total fineness of from 350 to 1100 dtex and that fineness of the sewing thread is from 630 to 2400 dtex. Further, it is preferred that the monofilament constituting the above multifilament has a round cross section. In addition, it is preferred that the base fabric and the sewing thread are constituted from polyamide or polyethylene terephthalate. The basis weight of the base fabric is preferred to be from 170 to 250 g/m². The sewing pitch is preferred to be within a range of from 2.0 to 6.7 stitches/cm.

As a result of making the fineness, and the cover factor, etc. of the base fabric within a predetermined range as mentioned above, it is possible to secure package ability of an air bag and, at the same time, it is possible to retain mechanical characteristic durable against the high-output and high-temperature gas generated from a compacted inflator.

Advantages of the Invention

According to the present invention, it is possible to reduce amount of the gas leaked from the sewn part of an air bag even when high-output and high-temperature gas is generated from a compacted inflator. It is also possible to provide an air bag which is in light weight and has good package ability while the body fabric of an air bag still has a mechanical characteristic durable to the gas of high temperature.

BEST MODE FOR CARRYING OUT THE INVENTION

The air bag of the present invention is an air bag for vehicles comprising a main body part consisting of a base fabric and a sewn part being formed by sewing, with a sewing thread, the above main body part into a bag, characterized in that, the difference (A−B) between the elongation A (%) of the sewing thread upon applying the tension of 31.3/a (N/thread) to the sewing thread and the elongation B (%) of the base fabric upon applying the tension of 62.5/a (N/stitch) to the base fabric [wherein "a" (stitch(es)/cm) is a sewing pitch in the sewn part] is within a range of 0 to 0.5% in both directions of warp and weft and the air permeability of the sewn part at 40 kPa during the initial stage of development of an air bag is less than 50 mm/cm/sec. It has been also found that, particularly when the elongation B (%) is less than 2% in both directions of warp and weft, the outcome is more preferable for a low-cost inflator.

Firstly, the base fabric for an air bag according to the present invention will be specifically illustrated.

The base fabric for an air bag of the present invention may be either coated or non-coated but, for overcoming the disadvantages such as increase in cost and deterioration of package ability for an air bag as a result of a coating treatment, a base fabric which is not surface-coated by synthetic resin, etc. is preferred.

Examples of the material which can be used for the base fabric for an air bag of the present invention include polyamide fiber such as Nylon 6•6, Nylon 6, Nylon 12, Nylon 4•6, a copolymer of Nylon 6 with Nylon 6•6 and a copolymer where Nylon 6 is copolymerized with polyalkylene glycol, dicarboxylic acid, amine, etc.; polyester fiber such as homopolyester fiber including polyethylene terephthalate or polybutylene terephthalate and a copolymer where an acid component constituting repeating unit of polyester is copolymerized with an aliphatic dicarboxylic acid such as isophthalic acid, 5-sodium sulfoisophthalate or adipic acid; aramid fiber represented by a copolymer of p-phenyleneterephthalamide with an aromatic ether; rayon fiber; polysulfone fiber; ultra-high-molecular-weight polyethylene fiber; and a fiber which is constituted from a high-molecular sequenced fiber having a sea-island structure mainly comprising the above synthetic fibers. Among them, polyamide fiber and polyethylene terephthalate fiber are preferred and polyamide fiber such as Nylon 6•6 and Nylon 6 are particularly preferred in view of shock resistance.

The fiber as such may further contain various kinds of commonly used additives for improving the productivity during the manufacturing step of the starting yarn or the processing step and for improving the characteristics. For example, there may be contained heat stabilizer, antioxidant, stabilizer against light, lubricant, antistatic agent, plasticizer, thickener, pigment, flame retardant, etc.

The total fineness of multifilament constituting the base fabric for an air bag of the present invention is preferred to be 350 dtex or more, more preferred to be 420 dtex or more, and particularly preferred to be 470 dtex or more in view of tensile strength and tear strength of the base fabric. In view of softness of the base fabric and package ability of the air bag, it is preferred to be 1100 dtex or less, more preferred to be 950 dtex or less, and particularly preferred to be 840 dtex or less. As a result of adjusting the total fineness of multifilament to the above range, it is possible to prepare an air bag which is rarely damaged for its body fabric by a high-temperature inflator and is excellent in package ability.

Tensile strength of the multifilament is preferred to be high in view of mechanical characteristic and is preferred to be 7.0 cN/dtex or more, more preferred to be 7.5 cN/dtex or more, and particularly preferred to be 8.0 cN/dtex or more. Although the upper limit of the tensile strength is not particularly limited, it is suitable to be 10.0 cN/dtex or less when Nylon 6•6 fiber is used.

Elongation at breakage of the multifilament is preferred to be 15% or more. In the base fabric for an air bag, elongation is different among warp and weft directions and also oblique direction. When the elongation at breakage of the multifilament is 15% or more, stress is hardly concentrated to an area where elongation is small upon development of an air bag whereby the inner pressure can be kept within a predetermined range upon development of an air bag. Elongation at breakage of the multifilament is more preferred to be 18% or more and particularly preferred to be 20% or more. Elongation at breakage is preferred to be relatively high but, practically, it is 30% or less and more preferred to be 25% or less.

Shrinking rate of the multifilament in boiling water is preferred to be 5% or more and more preferred to be 8% or more in view of reduction of air permeability. When the shrinking rate is too high, there is a possibility that thickness of the fabric after shrinking process becomes large and, in view of compactness, it is preferred to be 15% or less and more preferred to be 12% or less. When the shrinking rate in boiling water is made within the above range, a base fabric for an air bag having low permeability and compactness can be prepared as a result of the shrinking treatment which will be mentioned later.

With regard to the multifilament, substantially non twist yarn or soft twist yarn is preferred and the non twist yarn is more preferred. When the multifilament is substantially non twist yarn or soft twist yarn, expansion of the monofilament is not disturbed and air permeability of the base fabric can be made low.

Although the fineness of the monofilament constituting the above multifilament is not particularly limited, it is preferred to be 6.0 dtex or less, more preferred to be 4.0 dtex or less, and particularly preferred to be 3.5 dtex or less when security of the spinning operation and security of the package ability of air bag are taken into consideration. Also, it is preferred to be 1.0 dtex or more, more preferred to be 2.0 dtex or more, and particularly preferred to be 2.4 dtex or more.

Incidentally, in view of easy spinning technique and of thread quality, cross section of the monofilament is preferred to be round. As compared with a monofilament of other cross sections such as in a flat or rectangular shape, spinning is easy and predetermined starting yarn strength is apt to be achieved in the case of a monofilament having a round cross section. Further, when the cross section of a monofilament is round, cross section of the thread is well aligned in a predetermined direction upon weaving and folding an air bag whereby the desired low air permeability is apt to be achieved. In addition, even when draft is carried out for enhancing the starting yarn strength, fluff is hardly generated on the starting yarn whereupon a thread of high quality is prepared.

With regard to the weaving density of the base fabric of an airbag of the present invention, it is sufficient to consider in a combination with fineness of multifilament or, in other words, cover factor (CF). Weaving density of the base fabric is preferred to be within a range of 35 to 65 yarn numbers/inch. When low air permeability and edgecomb resistance necessary for the base fabric for air bag are taken into consideration, the cover factor is preferred to be 1700 or more, more preferred to be 1900 or more, and particularly preferred to be 2000 or more. Further, in view of strength physical property, low air permeability, base fabric mass and package ability of base fabric, the cover factor is preferred to be 2500 or less, more preferred to be 2300 or less, and particularly preferred to be 2200 or less. Incidentally, the cover factor (CF) is calculated by the following formula:

$$CF=(A\times 0.9)^{1/2}\times(W1)+(B\times 0.9)^{1/2}\times(W2)$$

In the formula, A and B are thickness (dtex) of warp and weft, respectively and W1 and W2 are warp density and weft density (yarn numbers/inch), respectively.

Basis weight of the base fabric for an air bag according to the present invention is preferred to be 170 g/m$^2$ or more, more preferred to be 190 g/m$^2$ or more, and particularly preferred to be 200 g/m$^2$ or more in view of strength and compactness of the base fabric. In view of heat resistance and package ability of an air bag, it is preferred to be 250 g/m$^2$ or less, more preferred to be 240 g/m$^2$ or less, and particularly preferred to be 230 g/m$^2$ or less. As a result of adjusting the basis weight of the base fabric to the above range, a base fabric for an air bag satisfying all of heat resistance, strength and compactness can be prepared.

In view of the mechanical characteristic, tensile strength of base fabric for an air bag according to the present invention is preferred to be 600N/cm or more and more preferred to be 650N/cm or more. Although the upper limit of the tensile strength is not particularly limited, it is preferred to be 1000 N/cm or less and more preferred to be 900N/cm or less in view of the relation among fineness and strength of the multifilament used and weaving density of the base fabric.

Elongation at breakage of base fabric for an air bag is preferred to be 23% or more. In the base fabric for an air bag, elongation is different among warp and weft directions and also oblique direction. Therefore, when the elongation at breakage of the base fabric for an air bag is 23% or more, stress is hardly concentrated to an area where elongation is small upon development of an air bag whereby a predetermined development inner pressure can be maintained. Elongation at breakage of the base fabric for an air bag is more preferred to be 25% or more and particularly preferred to be 26% or more. Elongation at breakage is preferred to be relatively high but, practically, it is 40% or less, more preferred to be 38% or less, and particularly preferred to be 35% or less.

In the base fabric for an air bag according to the present invention, its package ability in a package ability test stipulated by ASTM D 6478 is preferred to be 3000 cm$^3$ or less, more preferred to be 2800 cm$^3$ or less, particularly preferred to be 2600 cm$^3$ or less, and especially preferred to be 2400 cm$^3$ or less in view of making the weight light and the size compact. Although the lower limit of the package ability is not particularly limited in view of making the weight light and the size compact, it is preferred to be 1700 cm$^3$ or more, more preferred to be 1900 cm$^3$ or more, and particularly preferred to be 2100 cm$^3$ or more in a commonly used base fabric.

With regard to the weaving tissue of the base fabric for an air bag according to the present invention, examples thereof include plain weave, twill weave, satin weave and modified tissues thereof. Among them, plain weave is preferred because of its excellent mechanical characteristic.

Although a weaving machine used in steps for the manufacture of the base fabric for an air bag according to the present invention is not particularly limited, examples of the usable one include water jet loom, air jet loom, rapier loom and projectile loom. When weaving productivity, reduction of damage to the starting yarn, non-use of paste for warp, etc. are taken into consideration, water jet loom and air jet loom are particularly preferred. Further, in order to make the removal of oil for starting yarn and oil for warping during the processing easier, a water jet loom where most of them can be removed with water upon weaving is most preferred in such a view that the scouring steps can be simplified.

Heating temperature for a shrinking treatment in a step for the manufacture of base fabric for an air bag is not particularly limited and is usually 80 to 200° C. and more preferably 160° C. or less.

With regard to an apparatus for the above shrinking treatment, examples thereof include heat setter and boiling water bath. Although there is no particular limitation therefor, it is preferred to use an apparatus where both longitudinal and transverse overfeeds can be done to an extent of about 2 to 15% in such a view that low air permeability can be achieved.

Now, the sewn part of an air bag according to the present invention will be specifically illustrated.

Examples of the material which can be used for the sewing thread of the sewn part include polyamide fiber such as Nylon 6, Nylon 6•6, Nylon 12, Nylon 4•6, a copolymer of Nylon 6 with Nylon 6•6 and a copolymer where Nylon is copolymerized with polyalkylene glycol, dicarboxylic acid, amine, etc.; polyester fiber such as homopolyester fiber including polyethylene terephthalate or polybutylene terephthalate and a copolymer where an acid component constituting repeating unit of polyester is copolymerized with an aliphatic dicarboxylic acid such as isophthalic acid, 5-sodium sulfoisophthalate or adipic acid; aramid fiber represented by a copolymer of p-phenyleneterephthalamide with an aromatic ether; rayon fiber; ultra-high-molecular-weight polyethylene fiber; sulfon fiber such as p-phenylenesulfon or polysulfon; polyetherketon fiber; carbon fiber; and glass fiber. Among them, polyamide fiber and polyethylene terephthalate fiber are preferred and polyamide fiber such as Nylon 6•6 and Nylon 6 are particularly preferred in view of shock resistance.

The fiber as such may further contain various kinds of commonly used additives for improving the productivity during the manufacturing step of the starting yarn or the processing step and for improving the characteristics. For example, there may be contained heat stabilizer, antioxidant, stabilizer against light, lubricant, antistatic agent, plasticizer, thickener, pigment, flame retardant, etc.

Although fineness of the sewing thread used in the above sewn part is not particularly limited, it is preferred to be 700 dtex or more, more preferred to be 840 dtex or more, and particularly preferred to be 960 dtex or more for securing the necessary strength at the sewn part. When the sewing thread becomes thick, heat resistance and strength become to be preferable but thickness of the sewn part becomes large. Thus, fineness of the sewing thread is preferred to be 2400 dtex or less, more preferred to be 1850 dtex or less, and particularly preferred to be 1400 dtex or less in view of the thickness.

Tensile strength of the above sewing thread is preferred to be 6.0 cN/dtex or more, more preferred to be 6.5 cN/dtex or more, and particularly preferred to be 7.0 cN/dtex or more in view of mechanical characteristic. When tensile strength of the sewing thread is 6.0 cN/dtex or more, breakage of the sewing thread by insufficient strength upon development of an air bag can be suppressed. As a result, gas leakage from the sewn part hardly happens whereby the inner pressure-maintaining property necessary as an air bag can be maintained. Although there is no particular limitation for the upper limit of the tensile strength, it is preferred to be 10 cN/dtex or less, more preferred to be 9.5 cN/dtex or less, and particularly preferred to be 9.0 cN/dtex or less when Nylon 6•6 fiber is used.

With regard to elongation at breakage of the above sewing thread, it is preferred to be 25% or more. When the elongation at breakage of the sewing thread is 25% or more, sewing thread can follow the base fabric which is expanded upon development of an air bag and gas leakage from stitch can be suppressed whereby a predetermined development inner pressure can be maintained. More preferably, elongation at breakage of the sewing thread is 28% or more, and particularly preferably 30% or more. Although the elongation at breakage is preferred to be relatively high, it is practically 45% or less, more preferably 40% or less, and particularly preferably 38% or less.

Although the manufacturing method for the sewing thread is not particularly limited, a means which enhances the elongation of the sewing thread itself is preferably adopted. For example, when a sewing thread of 1400 dtex is to be manufactured, a thing where the thread of 1400 dtex is processed as a sewing thread may be used but it is preferred at that time to enhance the apparent elongation of the thread by conducting the twisting of 50 T/m or more, more preferably 100 T/m or more and, still more preferably, 150 T/m or more. As a result of such a constitution, elongation under the stress resulting upon development of an air bag becomes large even in case the fineness is large whereby the leakage from the sewn part of an air bag becomes small. When the number of twist is more, the resulting elongation is higher but, when the number of twist is too much, snarl or the like is generated and working ability becomes bad whereby that is not preferred. It is preferred to be 300 T/m or less, more preferred to be 250 T/m or less, and particularly preferred to be 200 T/m or less. That is also the same when three threads of 470 dtex are twisted to give a sewn thread corresponding to 1400 dtex. It is also possible to form a sewn thread using POY or the like. It does not matter whether the sewing thread is colored or is previously subjected to a resin processing.

The sewing method for a sewing thread in the sewn part is not particularly limited and may be selected depending upon the used base fabric, the specification for an air bag, the demanded strength of the area to be mounted, etc. Examples thereof include lock stitch, ring stitch, double ring stitch and overlock stitch. Among them, lock stitch and double ring stitch are advantageously used in view of good working ability, enhancement of strength of sewn part, reduction of gas leakage from the sewn part, etc.

Sewing pitch is not particularly limited as well and may be selected in view of the balance between the amount of air permeated from the sewn part and the strength at the sewn part. Sewing pitch is preferred to be 2.0 stitches/cm or more, more preferred to be 2.5 stitches/cm or more, and particularly preferred to be 3.3 stitches/cm or more. When the sewing pitch is 2.0 stitches/cm or more, amount of leaked gas from the joined area of the base fabric can be reduced. In addition, the sewing pitch is preferred to be 6.7 stitches/cm or less, more preferred to be 5.6 stitches/cm or less, and particularly preferred to be 4.5 stitches/cm or less. When the sewing pitch is 6.7 stitches/m or less, handling of a needle is quick and working ability becomes good. Moreover, since the numbers of stitch are small, air permeability can be made better.

As hereunder, the air bag according to the present invention will be specifically illustrated.

The air bag of the present invention is characterized in that, the difference (A−B) between the elongation A (%) of a sewing thread upon applying the tension of 31.3/a (N/thread) to the sewing thread and the elongation B (%) of a base fabric upon applying the tension of 62.5/a (N/stitch) to the base fabric [wherein "a" (stitch(es)/cm) is a sewing pitch in the sewn part] is within a range of 0 to 5.0% in both directions of warp and weft and the air permeability of the sewn part at 40 kPa during the initial stage of development of an air bag is less than 50 mm/cm/sec.

Figure 1:
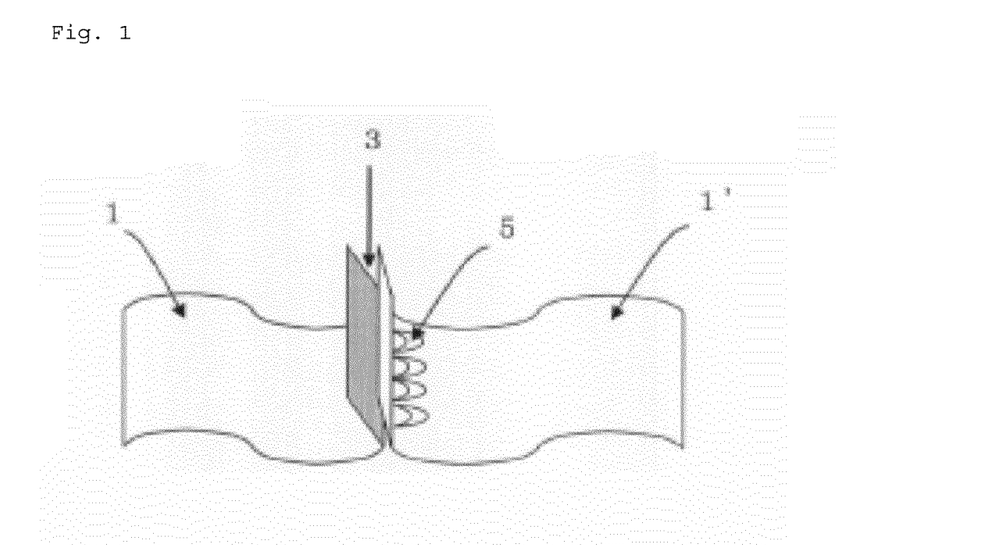
FIG. 1 is a rough illustrative drawing which shows the position of gas leakage in a sewn part of an air bag.

As to the cause for the gas leakage from the sewn part upon development of an air bag, there are presumed (i) stitch opening in a joined area of the base fabric and (ii) slippage in the stitch of a sewn part. FIG. 1 is a brief illustration drawing which shows the position of gas leakage in a sewn part of an air bag. It is presumed that gas leakage often happens from the joined area 3 of the base fabrics 1, 1' and from the stitch 5 of the sewn part.

When an air bag for the driver's seat is taken as an example, the tension f applied onto the surface of base fabric upon development of an air bag can be determined as follows: Thus, with a supposition that the volume of an air bag is 60 L and the shape of an air bag is spherical, radius r of an air bag is calculated as about 25 cm. When the inner pressure p upon development of an air bag is supposed to be 50 kPa, the tension f applied to the surface of a base fabric is shown by f=rp/2 and is calculated as 62.5N/cm. When the sewing pitch at the sewn part is a (stitch(es)/cm), the tension E applied to the sewing thread is calculated by the following formula since, upon development of an air bag, two sewing threads receive the tension for one sewn stitch:

$E(N/\text{thread})=62.5/2a$ (i.e. $31.3/a$)

The present inventors have found that, when a base fabric of low fineness and having a good package ability is used, slippage of the stitch resulted by elongation of the base fabric upon development greatly contributes in gas leakage of the sewn part and considered that, when elongation of the sewn thread is adjusted so as to follow the elongation of the base fabric under an inner pressure upon development (i.e., in case the tension applied to the surface of the base fabric is 62.5N/cm), gas leakage due to slippage of the stitch can be suppressed.

The air bag of the present invention has been achieved on the basis of the above finding. Thus, it is necessary, in the air bag of the present invention, that the difference (A–B) between the elongation A (%) of a sewing thread upon applying the tension of 31.3/a (N/thread) to the sewing thread and the elongation B (%) of a base fabric upon applying the tension of 62.5/a (N/stitch) to the base fabric [wherein "a" (stitch (es)/cm) is a sewing pitch in the sewn part] is within a range of 0 to 5.0% in both directions of warp and weft. The value of elongation difference (A–B) is preferably 0 to 4.8% and, more preferably, 0 to 4.5%. When the value of elongation difference (A–B) is made within the above range, the sewing thread follows the movement of the base fabric at the inner pressure upon development of an air bag and slippage of the stitch hardly happens whereby gas leakage due to slippage caused by sewing thread in the stitch can be suppressed. When elongations of the upper and the lower threads are different, a mean value of both elongations is adopted as elongation A.

On the other hand, when the value of the elongation difference (A–B) in any of warp and weft directions is more than 5.0%, no slippage of the stitch happens upon development of an air bag (in other words, gas leakage from the stitch does not increase) but elongation of the sewing thread becomes too much. Therefore, stitch opening becomes big at the joined area of the base fabric and leaking amount from the joined area increase. Further, when the value of the elongation difference (A–B) in any of warp and weft directions is lower than 0% (minus side), elongation of the sewing thread is less than elongation of the base fabric upon development of an air bag whereby the sewing thread cannot follow the movement of the base fabric. As a result, slippage of the stitch becomes large and leaking amount from the stitch increases.

In the air bag of the present invention, it is necessary that air permeability of the sewn part at 40 kPa during the initial stage of development of an air bag measured according to ASTM D 6476 is less than 50 mm/cm/sec. This air permeability is more preferred to be less than 48 mm/cm/sec and particularly preferred to be less than 45 mm/cm/sec. When the air permeability of the sewn part at 40 kPa during the initial stage of development of an air bag is less than 50 mm/cm/sec, well-balanced development is possible in the initial stage of development of an air bag.

As hereunder, adjustment of the elongation B under a predetermined tension E will be shown. The elongation B can be adjusted depending upon fineness and weaving constitution of the base fabric and upon the fact whether resin treatment or oil treatment is done. The resin treatment also includes the so-called coating fabric using silicone rubber or chloroprene rubber. In a low-cost inflator which has been increasingly used in recent years, it became clear that the generated gas is apt to become high temperature and that the conventionally-used base fabric and sewn part constituting an air bag are not sufficiently resistant to heat. As a result, damage is resulted in the main body of base fabric and sewn part, and it is becoming difficult to fulfill the property as an air bag. For solving the problem as such, it is preferred to use a base fabric having excellent heat resistance or, in other words, a base fabric having fineness of 350 dtex or more. However, use of just this base fabric is not enough for suppressing the leakage from the sewn part. As a result of taking the consideration into the air permeation from the sewn part as well, the present invention has now been achieved. That is, for enhancing the heat resistance, it is preferred that the fineness used for the base fabric is higher. However, when a predetermined weaving density (cover factor within a predetermined range) is adopted within such a high fineness range, the value of the elongation B tends to become small as compared with a fabric using a thread having low fineness under the same cover factor. Therefore, there is resulted a necessity for adjusting the elongation A of the sewing thread. It is preferred that the elongation A of the sewing thread is large but, when fineness of the sewing thread is made small, the sewing thread breaks due to the pressure upon development and due to the gas of high temperature and that is not preferred. Preferred fineness of the sewing thread is 700 dtex or more. The high fineness is preferred because heat resistance and strength become high thereby. With high fineness, however, the elongation A of the thread tends to small. Thus, it can be conducted for enhancing the elongation A that, within such an extent that heat resistance and strength are acceptable, value of fineness is modified, the relation between strength and elongation of the starting yarn constituting the sewing thread is modified (to be more specific, the spinning condition and the draft condition in the manufacture of thread are modified) or the number of twist upon the sewing thread manufacture or the condition for thermal setting are modified. With regard to the preferred range of the elongation A, it may be selected in relation to the elongation B.

EXAMPLES

The present invention will now be illustrated in detail by referring to the following Examples and Comparative Examples although the present invention shall not be limited thereto but any modification thereof is within the technical scope of the present invention provided that the modification is not out of scope of the spirit which is mentioned hereinabove and later. Although the gas temperature in actual development of an air bag is not clear, there is a possibility that the temperature at the outlet of an inflator is not lower than 1000° C. and that the temperature applied to the base fabric reaches nearly 200° C. However, since it is believed that the tendency of air permeability of the sewn part measured at 20° C. does not change even at high temperature, air permeability of a sewn sample at ambient temperature was evaluated in Examples and Comparative Examples for the sake of convenience.

Evaluation of each property in Examples and Comparative Examples of the present invention was conducted according to the following methods:

<Fineness of Thread>

Fineness of thread was measured according to JIS L 1013 8.3.

<Shrinking Rate of Thread in Boiling Water>

Shrinking rate of thread in boiling water was measured according to JIS L 1013—Method B (at 100° C.) for Shrinking Rate.

<Tensile Strength and Elongation at Breakage of Thread>

Tensile strength and elongation at breakage of thread were measured according to JIS L 1013 8.5.

<Edgecomb Resistance of Base Fabric>

Edgecomb resistance of base fabric was measured according to ASTM D6479.

<Difference Between Elongations of Sewing Thread and Base Fabric>

Figure 2:
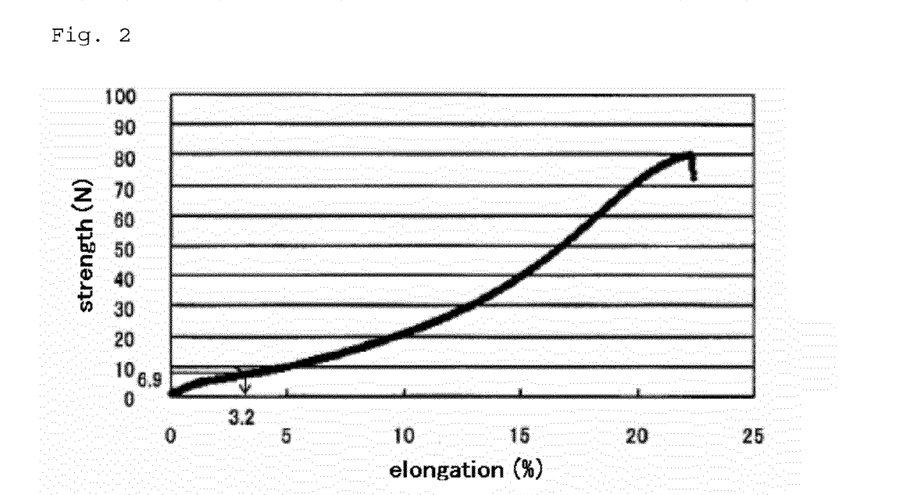
FIG. 2 is a graph which shows the relation between elongation and strength of the sewing thread in Examples and Comparative Examples.

Relation between elongation and strength of the sewing thread was measured according to JIS L 1013 8.5. During the measurement, relation between the elongation (%) and the strength (N) was recorded (by, for example, preparing a curve of FIG. 2). From this curve showing the relation between the elongation (%) and the strength (N), elongation corresponding to the tensile strength of 31.3/a applied to sewing thread of an air bag was read and adopted as the elongation A. For example, since the sewing pitch in FIG. 2 is 4.5 stitches/cm (Example 1), tension applied to the sewing thread is calculated as 31.3/4.5, i.e. 6.9N/thread. From the above curve, it is read that the elongation A corresponding to 6.9N of the tensile strength is 3.2%. Hereinabove, "a" stands for a sewing pitch in a sewn part.

Figure 3:
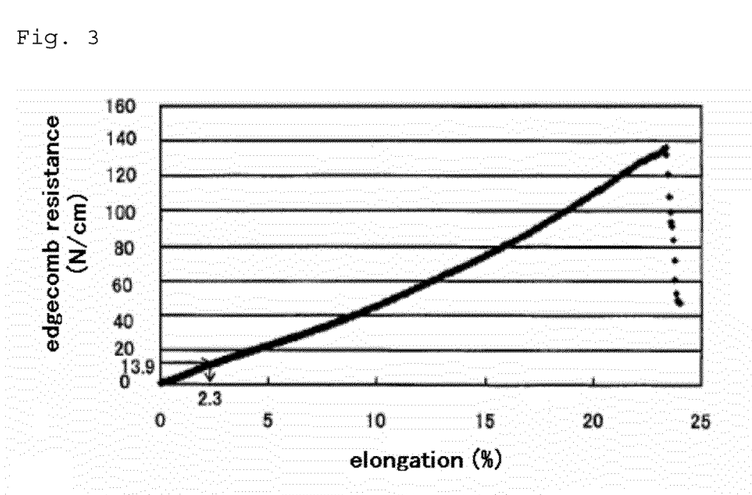
FIG. 3 is a graph which shows the relation between elongation and edgecomb resistance of a base fabric (in a longitudinal direction) in Examples and Comparative Examples.

In addition, the relation between elongation and edgecomb resistance of the base fabric was measured according to ASTM D 6479. During the measurement, relation between the elongation (%) and the edgecomb resistance (N/5 cm) was recorded. Unit of the above edgecomb resistance was converted from N/5 cm to N/cm and a curve showing the relation between the elongation (%) and the edgecomb resistance (N/cm) was prepared (such as a graph of FIG. 3). From the resulting curve showing the relation between the elongation (%) and the edgecomb resistance (N/cm), elongation corresponding to the edgecomb resistance of 62.5/a applied to the base fabric of an air bag was read and adopted as elongation B. For example, in FIG. 3, since the sewing pitch is 4.5 stitches/cm (Example 1), the tension applied to the longitudinal direction of the base fabric is calculated as 62.5/4.5, i.e. 13.9N/stitch. From the above curve, it is read that the elongation B corresponding to 13.9 N/cm of edgecomb resistance is 2.3%. Hereinabove, "a" stands for a sewing pitch in a sewn part.

Difference between the elongation A of the sewing thread and the elongation (B) of the base fabric (A–B) was defined as "the difference between the elongations of sewing thread and base fabric".

<Tensile Strength and Elongation at Breakage of Base Fabric>

Tensile strength and elongation at breakage of base fabric were measured according to JIS L 1096 8.12.1.

<Weaving Density of Base Fabric>

Weaving density of base fabric was measured according to JIS L 1096 8.6.1.

<Basis Weight of Base Fabric>

Basis weight of base fabric was measured according to JIS L 1096 8.4.

<Package Ability>

Package ability was measured according to ASTM D6478.

<Sewing Pitch>

Lengths from central value of a sewing thread to central value of the adjacent sewing thread were measured for five optional places and their mean value was determined. Stitch numbers per cm were calculated from the above mean value.

<Air Permeability of Sewn Part>

Base fabrics of Examples and Comparative Examples were cut into 20 cm square. After directions of warp and weft were aligned, samples were prepared using a sewing thread by a sewing method mentioned in Examples and Comparative Examples. The resulting samples were used for measuring the air permeability according to ASTM D 6476 under the following conditions:

Start volume: 400 cm$^3$

Initial pressure: 225 kPa

Air permeability tester: FX 3350 (manufactured by Textest)

In order to eliminate the influence by the thickness of the sewn part, a sample was sandwiched by a circular silicone packing having thickness of 2 mm and diameter of 8 cm and, under the above conditions, "air permeability of entire sample including sewn part" and "air permeability of only main body part consisting of a base fabric" were measured. Relation between the measured pressure and air permeation speed was inputted into a computer using an L 5110 evaluation program LABODATA II (manufactured by Textest). From the resulting relation between pressure and air permeation speed, the air permeability at 40 kPa during the initial stage of development of an air bag was determined.

With regard to "air permeability of sewn part" at 40 kPa, difference between "air permeability of entire sample including sewn part" at 40 kPa and "air permeability of only main body part consisting of a base fabric" at 40 kPa was calculated, divided by the length of the sewn part (8 cm) and the resulting value was adopted.

<Heat Resistance Test>

The same sample as above for the air permeability test for sewn part was prepared and placed on a desk. The sewn part where the threads were put together was made the upside on the desk. Hot air at the temperature of 300° C. was vertically jetted for 20 seconds from the height of 10 cm above the desk and the damage of the base fabric after the jetting was confirmed. The case where no hole was noted in both main body fabric and sewn part was marked "○"; the case where hole was noted in any of main body fabric and sewn part was marked "Δ"; and the case where holes were noted in both of main body fabric and sewn part was marked "x".

Example 1

Nylon 6•6 filament starting yarn (cross section of monofilament was round) having fineness of 470 dtex/72 f, tensile strength of 8.6 cN/dtex, elongation at breakage of 20% and shrinking rate in boiling water of 9.5% was used for warp and weft, and woven into plain weave using a water jet loom at the weaving density of 55 yarn numbers/inch for both warp and weft, passed through a shrinking bath of hot-water without drying and passed through a dry-finishing step using a suction-drum drier comprising two steps where the first step temperature T1 was adjusted to 120° C. and the second step temperature T2 was adjusted to 125° C. Physical properties of the resulting base fabric were shown in Table 1.

In addition, using Nylon 6•6 thread having fineness of 1260 dtex, tensile strength of 8.0 cN/dtex and elongation at breakage of 29% as both upper and lower sewing threads, and adopting a ring sewing with the sewing pitch of 4.0 stitches/cm, a sewn sample for simulating a part of air bag was prepared from the above base fabric. Result of measurement of air permeability of the prepared sewn sample was shown in Table 1.

Example 2

Nylon 6•6 filament starting yarn (cross section of monofilament was round) having fineness of 700 dtex/144 f, tensile strength of 8.3 cN/dtex, elongation at breakage of 19% and shrinking rate in boiling water of 9.6% was used for warp and weft, and woven into plain weave using a water jet loom at the weaving density of 43 yarn numbers/inch for both warp and weft, passed through a shrinking bath of hot-water without drying and passed through a dry-finishing step using a suction-drum drier comprising two steps where the first step temperature T1 was adjusted to 120° C. and the second step temperature T2 was adjusted to 125° C. Physical properties of the resulting base fabric were shown in Table 1.

In addition, using Nylon 6•6 thread having fineness of 2520 dtex, tensile strength of 7.8 cN/dtex and elongation at breakage of 31% as both upper and lower sewing threads, and adopting a lock sewing with the sewing pitch of 4.5 stitches/cm, a sewn sample for simulating a part of air bag was prepared from the above base fabric. Result of measurement of air permeability of the prepared sewn sample was shown in Table 1.

Comparative Example 1

Nylon 6•6 filament starting yarn (cross section of monofilament was round) having fineness of 350 dtex/108 f, tensile strength of 8.6 cN/dtex, elongation at breakage of 20% and shrinking rate in boiling water of 9.0% was used for warp and weft, and woven into plain weave using a water jet loom at the weaving density of 59 yarn numbers/inch for both warp and weft, passed through a shrinking bath of hot-water without drying and passed through a dry-finishing step using a suction-drum drier comprising two steps where the first step temperature T1 was adjusted to 120° C. and the second step temperature T2 was adjusted to 125° C. Physical properties of the resulting base fabric were shown in Table 1.

In addition, using Nylon 6•6 thread having fineness of 1400 dtex, tensile strength of 8.3 cN/dtex and elongation at breakage of 21% as both upper and lower sewing threads, and adopting a lock sewing with the sewing pitch of 4.5 stitches/cm, a sewn sample for simulating a part of air bag was prepared from the above base fabric. Result of measurement of air permeability of the prepared sewn sample was shown in Table 1.

Comparative Example 2

Nylon 6•6 filament starting yarn (cross section of monofilament was round) having fineness of 235 dtex/72 f, tensile strength of 8.1 cN/dtex, elongation at breakage of 19% and shrinking rate in boiling water of 8.9% was used for warp and weft, and woven into plain weave using a water jet loom at the weaving density of 71 yarn numbers/inch for both warp and weft, passed through a shrinking bath of hot-water without drying and passed through a dry-finishing step using a suction-drum drier comprising two steps where the first step temperature T1 was adjusted to 120° C. and the second step temperature T2 was adjusted to 125° C. Physical properties of the resulting base fabric were shown in Table 1.

In addition, using Nylon 6•6 thread having fineness of 630 dtex, tensile strength of 7.6 cN/dtex and elongation at breakage of 32% as both upper and lower sewing threads, and adopting a lock sewing with the sewing pitch of 4.5 stitches/cm, a sewn sample for simulating a part of air bag was prepared from the above base fabric. Result of measurement of air permeability of the prepared sewn sample was shown in Table 1.

TABLE 1

|  | Example 1 | Example 2 | Comparative Example 1 | Comparative Example 2 |
|---|---|---|---|---|
| Base fabric | | | | |
| Fineness (dtex) warp/weft | 470/470 | 700/700 | 350/350 | 235/235 |
| Weaving density (yarn numbers/inch) warp/weft | 55/55 | 43/43 | 59/59 | 71/71 |
| Cover factor | 2262 | 2158 | 2098 | 2065 |
| Basis weight (g/m$^2$) | 225 | 263 | 177 | 141 |
| Tensile strength (N/cm) longitudinal/transverse | 733/753 | 865/910 | 614/630 | 492/504 |
| Elongation at breakage (%) longitudinal/transverse | 35/29 | 34/31 | 34/29 | 30/26 |
| Package ability (cm$^3$) | 2301 | 2717 | 1539 | 1301 |
| Sewing thread | | | | |
| Fineness (dtex) upper thread/lower thread | 1260/1260 | 2520/2520 | 1400/1400 | 630/630 |
| Tensile strength (cN/dtex) upper thread/lower thread | 8.0/8.0 | 7.8/7.9 | 8.3/8.3 | 7.6/7.6 |
| Elongation at breakage (%) upper thread/lower thread | 29/29 | 31/32 | 21/21 | 32/32 |
| sewing method/sewing pitch (stitch(es)/cm) | ring sewing/4.0 | lock sewing/4.5 | lock sewing/3.3 | lock sewing/4.5 |
| Elongation of base fabric and sewing thread | | | | |
| Base fabric (%) longitudinal/transverse | 1.9/1.8 | 1.7/1.5 | 2.9/2.4 | 4.1/4.4 |
| Sewing thread (%) upper thread/lower thread | 3.2/3.2 | 3.4/3.4 | 1.5/1.5 | 10.1/10.1 |
| Average of elongation of sewing thread (average of the upper thread/lower thread) | 3.2 | 3.4 | 1.5 | 10.1 |
| Elongation difference between sewing thread and base fabric (%) longitudinal/transverse | 1.3/1.4 | 1.7/1.9 | −1.4/−0.9 | 6.0/5.7 |

TABLE 1-continued

|  |  | Example 1 | Example 2 | Comparative Example 1 | Comparative Example 2 |
|---|---|---|---|---|---|
| Air permeability evaluation of sewn samples | | | | | |
| Warp direction | entire sample (mm/sec) | 650 | 640 | 740 | 910 |
| | main body part (mm/sec) | 280 | 270 | 310 | 480 |
| | sewn part (mm/cm/sec) | 46 | 46 | 54 | 54 |
| Weft direction | entire sample (mm/sec) | 660 | 650 | 640 | 860 |
| | main body part (mm/sec) | 280 | 270 | 310 | 430 |
| | sewn part (mm/cm/sec) | 47 | 48 | 41 | 54 |
| Heat resistance test | | ○ | ○ | Δ | x |

Base fabrics of Examples 1 and 2 show good mechanical characteristics. Moreover, in any of sewn samples using those base fabrics, difference between the elongation of sewn thread applied with the tension of 31.3/a (N/thread) and the elongation of base fabric applied with the tension of 62.5/a (N/stitch) was within a range of 0 to 5.0% in both directions of warp and weft and air permeability of the sewn part at 40 kPa during the initial stage of development of the air bag was less than 50 mm/cm/sec. Accordingly, air bags using the base fabric and the sewing thread of Examples 1 and 2 had a good mechanical characteristic. They were also good in view of the result of the heat resistance test as well. It is expected that, even when an inflator which generates such high pressure is used, slippage at the sewn part hardly happens and heat resistance is good whereby gas leakage from the sewn part during the initial stage of development of the air bag is little and well-balanced development is resulted.

On the contrary, since elongation at the sewn part is too low in the sewn sample of Comparative Example 1 and elongation of sewing thread is too high in the sewn sample of Comparative Example 2, air permeability at 40 kPa from the sewn part where warp direction was sewn was more than 50 mm/cm/sec in both samples. Accordingly, it is expected that air bags using the base fabric and the sewing thread of Comparative Examples 1 and 2 were apt to cause slippage of stitches and gas leakage from the sewn part is too much during the initial stage of development of the air bag whereby well-balanced development is not resulted.

INDUSTRIAL APPLICABILITY

In accordance with the present invention, difference in elongations of "base fabric" and "sewing thread" during development is optimized within a predetermined range and air permeability of the sewn part at the inner pressure during the initial stage of development of the air bag is lowly maintained whereby, even when high-output and high-temperature gas is generated from the compacted inflator, amount of the gas leaked from the sewn part of the air bag can be reduced.

EXPLANATION OF REFERENCE NUMBER

1, 1': base fabric
3: joined area
5: stitch of a sewn part

The invention claimed is:

1. An air bag for vehicles comprising a main body part consisting of a base fabric and a sewn part being formed by sewing, with a sewing thread, the main body part into a bag, wherein a difference between an elongation (A) of the sewing thread upon applying a tension of 31.3/a (unit: N/thread) to the sewing thread and an elongation (B) of the base fabric upon applying a tension of 62.5/a (unit: N/stitch) to base fabric, wherein "a" (unit: stitch(es)/cm) is a sewing pitch in the sewn part, is within a range of 0 to 5.0% in both directions of warp and weft, the value of B is less than 2% in both directions of warp and weft, and an air permeability of the sewn part at 40 kPa during an initial stage of development of the air bag is less than 50 mm/cm/sec.

2. The air bag according to claim 1, wherein cover factor (CF) of the base fabric defined by the following formula is from 2050 to 2400:

$$CF=(A\times0.9)^{1/2}\times(W1)+(B\times0.9)^{1/2}\times(W2)$$

wherein A and B are thickness (dtex) of warp and weft, respectively and W1 and W2 are warp density and weft density (yarn numbers/inch), respectively.

3. The air bag according to claim 1, wherein the base fabric is constituted from multifilament having total fineness of from 350 to 1100 dtex and fineness of the sewing thread is from 630 to 2400 dtex.

4. The air bag according to claim 3, wherein a monofilament constituting the above multifilament has a round cross section.

5. The air bag according to claim 1, wherein the base fabric and the sewing thread are constituted from polyamide or polyethylene terephthalate.

6. The air bag according to claim 1, wherein basis weight of the base fabric is from 170 to 250 g/m$^2$.

7. The air bag according to claim 1, wherein the sewing pitch is within a range of from 2.0 to 6.7 stitches/cm.

* * * * *